May 5, 1964  JEAN-PIERRE L. WIRZ  3,131,890
AIRCRAFT CONTROL MECHANISM
Filed Jan. 21, 1963  3 Sheets-Sheet 1
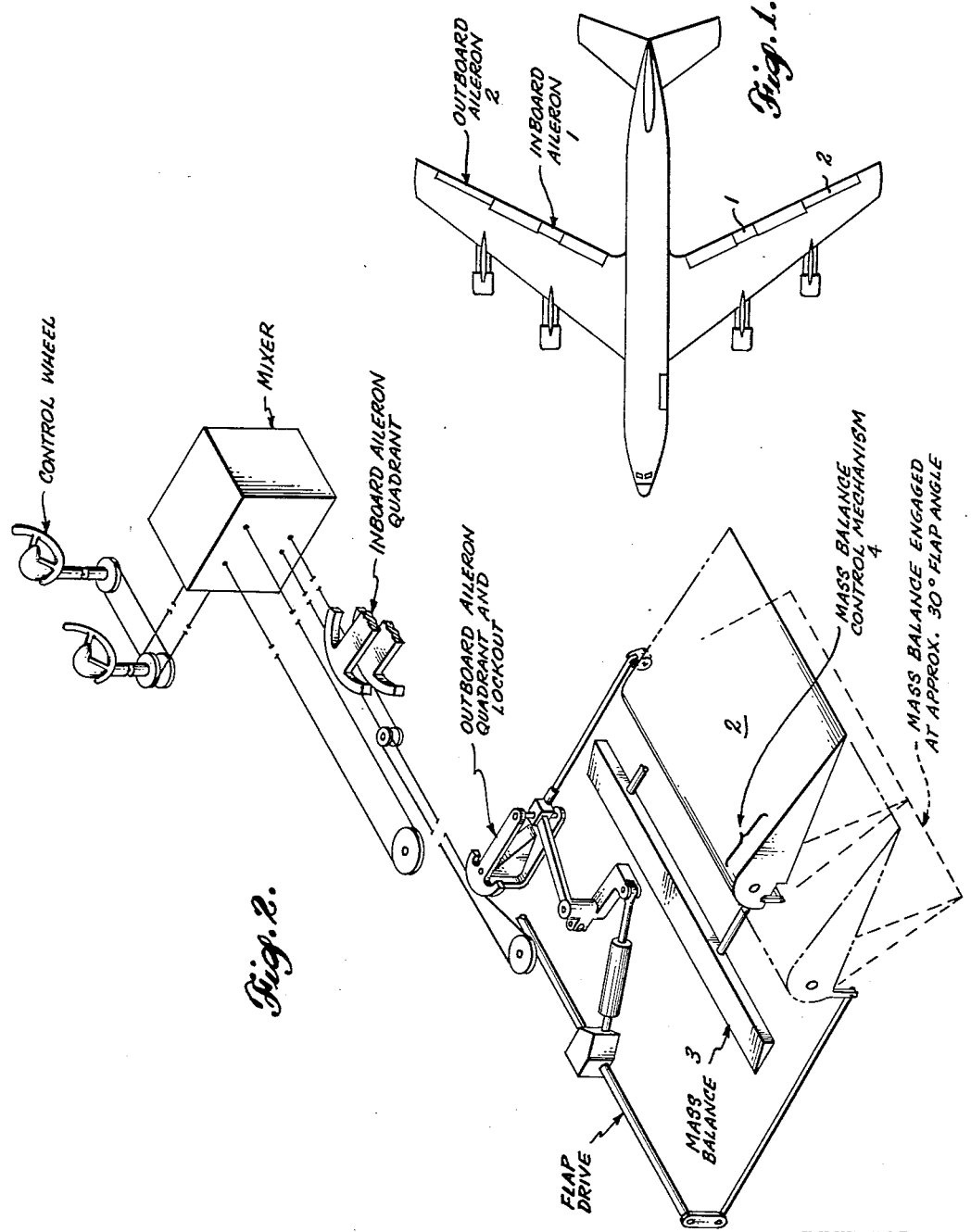
INVENTOR.
JEAN-PIERRE L. WIRZ
BY L E Carnahan
AGENT

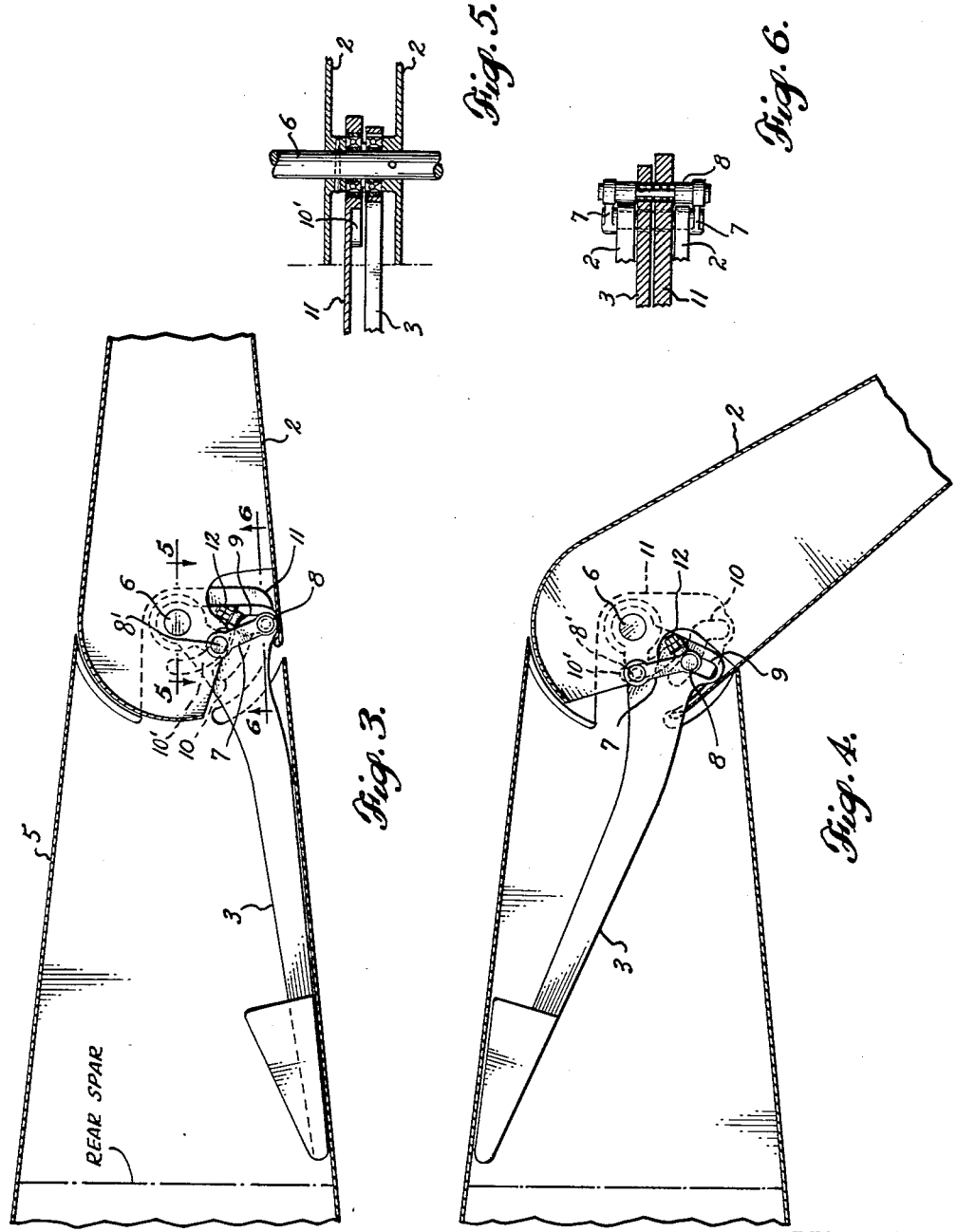

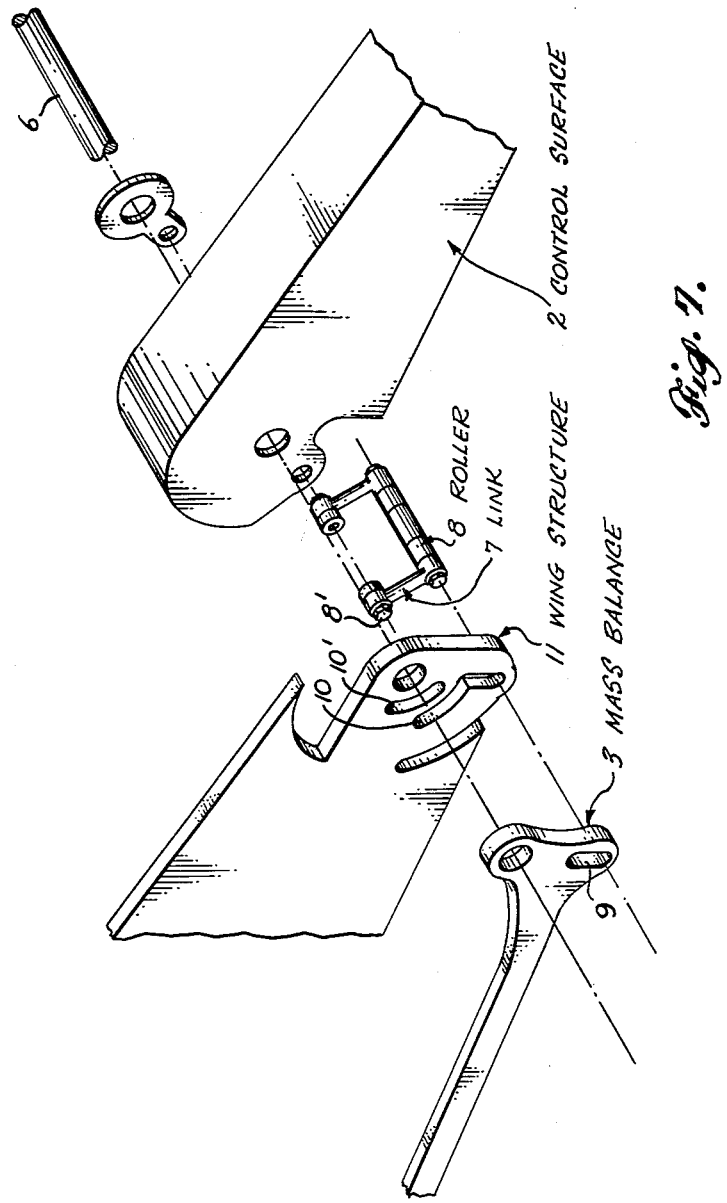

3,131,890
AIRCRAFT CONTROL MECHANISM
Jean-Pierre L. Wirz, Seattle, Wash., assignor to The Boeing Company, Seattle, Wash., a corporation of Delaware
Filed Jan. 21, 1963, Ser. No. 252,681
7 Claims. (Cl. 244—75)

This invention relates to control mechanism for aircraft, particularly to an automatic balancing system for aircraft control-surfaces such as ailerons, elevator controls, and horizontal flaps, and more particularly to an automatic balancing system for ailerons of a high lift wing aircraft utilizing a boundary layer control system, where it is desirable to deflect the aileron to a certain angle to get full flap benefit.

When a flaperon is used as an aileron, a problem of great importance is to maintain a mass balance during "aileron" operation while deflecting the flaperon at any angle. Since the flap deflection would require a travel angle of the mass balance greater than the space provided inside the wing profile, it is necessary to provide a mechanism to allow for the needed movement of the mass balance.

At the present time, three solutions are generally adopted to solve the problem of balancing control-surfaces. The first solution consists of fixing, on the exterior of these surfaces, a balancing mass at the extremity of an arm, the arm extending for a sufficient distance towards the front and sufficiently below the airfoil section for the weight of the mass to balance the weight of the control fin, and also so that the fin can carry out its movements. This solution has two principle disadvantages; namely, additional weight and aerodynamic drag.

The second solution consists in housing the balancing mass within the limits of the depth of the section of the wing. The space available for that purpose is extremely small in spite of the low value of the total angle of movement of the control-surface. It follows that, since the balancing mass is placed very close to the pivotal axis of the control-surface, a considerable weight must necessarily be used, thus again having the additional weight disadvantage.

The third solution consists of an automatic balancing arrangement for aircraft control-surfaces, such as described in U.S. Patent No. 2,859,925, which is essentially constituted by at least one counter-weight arranged at the extremity of a lever-arm of sufficient length for the mass of the said counter-weight to be as small as possible, this lever not being rigidly connected to the control but pivotally-mounted upon it, and being operated by a suitable device in such manner that, when the control-surface pivots in a given direction, the lever pivots in the opposite direction, thus the balancing lever is always contained within the limits of space in the wing or other member within which the lever is housed. This third solution includes mechanism for allowing a predetermined amount of movement of the control-surface without interconnection with the balancing lever.

The instant invention functions on substantially the same principle as the mechanism described in the above cited Patent 2,859,925, but overcomes the undesirable features of the patent; namely, the use of worm gears and screw drives which cause backlash and play; the flight safety hazard of dynamic excitation of oscillation of the control-surface; and the additional weight and maintenance of the gear system. In addition to overcoming the above undesirable features, the invention provides an automatic balancing mechanism while allowing space in the wing for a boundary layer control duct utilized on high lift wing aircraft.

Therefore, an object of the invention is to provide an automatic balancing mechanism for the control-surfaces of an aircraft.

A further object of the invention is to provide an automatic balancing mechanism for the control-surfaces of an aircraft which allows a predetermined amount of movement of the control-surface without interconnecting the balancing mass of the mechanism.

Another object of the invention is to provide an automatic balancing mechanism for the control-surfaces of an aircraft which includes members having slots therein and roller means adapted to travel in the slots, said slots being shaped to control the desired movement of the balancing mass of the mechanism.

These and other objects of the invention not specifically set forth above will become readily apparent from the accompanying description and drawings in which:

FIG. 1 is a plan view of an aircraft utilizing the invention;

FIG. 2 schematically shows the invention and the control system therefor;

FIG. 3 shows the invention in its nonactuated position;

FIG. 4 shows the invention in its actuated position;

FIG. 5 is a cross-sectional view of the bearing means taken on line 5—5 of FIG. 3;

FIG. 6 is a cross-sectional view of the roller means taken on line 6—6 of FIG. 3; and FIG. 7 is an exploded view of the invention.

In the 707 aircraft, for example, the flaperon system provides about 26° down deflection of both flaperons from a horizontal cruise position to a high lift slow flight position for landing and takeoffs. Also, the 707 flaperon system provides differential movement of the flaperons in any movement thereof beyond the initial 26°, i.e., while one flaperon may be actuated downward to a full 52° position to provide lifting or aileron function, the other flaperon remains at the 26° flap position, and vice versa.

The invention basically comprises rollers, slots, and linkage mechanism for permitting free movement of both flaperons (ailerons) throughout the flap position and maintaining the balancing mass locked down. Then for further downward aileron movement of either flaperon, the balancing mass is interconnected and raised, thus allowing the mass balance to operate within the space provided inside the wing profile.

Referring now to the drawings, FIG. 1 shows an aircraft having an inboard aileron 1 and an outboard aileron 2 on each wing.

FIG. 2 shows a control system for ailerons 1 and 2 of one wing. The control system for the ailerons is conventional except for the mass balance 3 for aileron 2 and control mechanism therefor which is generally indicated at 4 and shown in detail in FIGS. 3–7.

Throughout the remainder of the description, aileron 2 will be termed a control-surface to eliminate confusion due to the plurality of terms used in the art to identify the unit.

Referring now to FIGS. 3–7, control-surface 2 is shown pivotably connected with wing section 5, mass balance 3 being positioned within the wing section and aft of the rear spare of the wing as indicated by legend in FIG. 3.

Control-surface 2 pivots with shaft 6. A link 7 is pivotably mounted on the control surface 2. Link 7 carries a roller 8 which travels in slot 9 in the arm of mass balance 3 and in a fixed track 10 mounted to wing structure 11 of wing section 5. Link 7 also carries a roller 8' which travels in a fixed track 10' in structure 11. An adjustment 12 is provided for removing any play in the system.

The operation of the device is as follows: During the first degree of surface-control deflection of control-surface 2 with the corresponding movement of link 7 in tracks 10 and 10' and slot 9, the mass balance 3 is held in place, without gap, by the common shape of slot 9 and track 10, acting as a chuck, thus minimizing the possibility of dynamic excitation. As soon as the control-surface 2 reaches the angle where mass balance 3 is needed, the roller 8 changes its direction of travel in track 10 thus rotating mass balance 3 about the center of the control surface.

In the specific embodiment shown, during low speed operation, total deflection of control-surface 2 is 52° with mass balance 3 displacement being over the last 30° of the control-surface deflection. However, the slot 9 and track 10 can be designed to allow any desired mass balance displacement relative to a desired control-surface deflection.

While the description has been directed to outboard aileron 2 of the aircraft, the inboard aileron 1 can be also controlled in the same manner, if desirable.

It has thus been shown that the instant invention provides a simple and effective mechanism for control-surfaces of aircraft while overcoming each of the undesirable features of the devices presently known.

Although a particular embodiment of the invention has been illustrated and described, it will be obvious to those skilled in the art that various changes and modifications may be made without departing from the invention, and it is intended to cover in the appended claims all such changes and modifications that come within the true spirit and scope of the invention.

What I claim is:

1. In an aircraft, a control-surface, means for actuating said control-surface, said actuating means including an automatic balancing mechanism, said mechanism including a mass balance, track and follower means operatively associated with said mass balance and said control-surface, whereby said track and follower means move with respect to one another upon movement of said control-surface over a first distance without movement of said mass balance.

2. An automatic balancing device for the control-surface of aircraft comprising in combination, a control-surface arranged at the rear of and in the extension of a wing of an aircraft, means providing a pivotal axis for said control-surface for pivotal movement of the latter relative to said wing, lever means having a predetermined mass pivotably mounted on said axis means and arranged to remain continually within the interior of a section of said wing, said lever means being provided with slot means having a predetermined shape, linkage means mounted on said control-surface, said linkage means being provided with at least one roller means which is adapted to travel in the slot means of said lever means and in a predetermined shaped track means fixed in said wing.

3. The automatic balancing device defined in claim 2 wherein adjusting means are provided for removing play in the system.

4. In an aircraft, an automatic balancing device for a control-surface comprising: means providing a pivotal axis for said control-surface; means for actuating said control-surface; lever means having one end pivotably mounted on said axis means and the other end freely movable, said lever means being provided with slot means adjacent the said one end; track means fixedly attached to structure supporting said axis means; link means having roller means at one end thereof, the roller means at the one end of said link means being adapted to move in said slot means and said track means, said link means being pivotably connected at the other end thereof with said control-surface; and means for adjusting movement of said roller means.

5. The device defined in claim 4 wherein said slot means and said track means are shaped to provide movement of said control-surface over a predetermined distance without interconnection with said lever means and further movement of said control-surface interconnects said lever means therewith.

6. In an aircraft, a control-surface, means for actuating said control-surface, automatic balancing means for said control-surface, said balancing means including mass balance means, slot and track means having a predetermined shape, and link and roller means operatively associated with said slot and track means, whereby movement of said control-surface over a first distance moves said link and roller means with respect to said slot and track means without moving said mass balance means, and wherein further movement of said control-surface moves said mass balance means.

7. In an aircraft, a control-surface, means for actuating said control-surface, automatic balancing means for said control-surface, said balancing means including mass balance means, slot means and track means, and link means and roller means operatively associated with said slot means and said track means, and with said mass balance means, said slot means and track means being shaped to allow said control-surface to move over a first distance without interconnecting said mass balance means, and wherein further movement of said control-surface moves said mass balance means.

References Cited in the file of this patent

UNITED STATES PATENTS

| | | |
|---|---|---|
| 2,584,055 | Smith | Jan. 29, 1952 |
| 2,851,898 | Hasty | Sept. 16, 1958 |
| 2,859,925 | Gerin | Nov. 11, 1958 |